United States Patent
Alexandrov et al.

(10) Patent No.: US 11,699,177 B1
(45) Date of Patent: Jul. 11, 2023

(54) SYSTEMS AND METHODS FOR AUTOMATED MODELING OF QUALITY FOR PRODUCTS AND SERVICES BASED ON CONTEXTUAL RELEVANCE

(71) Applicant: PEAKSPAN CAPITAL MANAGEMENT, LLC, New York, NY (US)

(72) Inventors: Philip Alexandrov, New York, NY (US); Vikas Kumar, Livingston, NJ (US); Philip Dur, Burlingame, CA (US); Sanket Merchant, San Mateo, CA (US); Brian Mulvey, New York, NY (US)

(73) Assignee: PEAKSPAN CAPITAL MANAGEMENT, LLC, New York, NY (US)

( * ) Notice: Subject to any disclaimer, the term of this patent is extended or adjusted under 35 U.S.C. 154(b) by 0 days.

(21) Appl. No.: 17/846,235

(22) Filed: Jun. 22, 2022

(51) Int. Cl.
*G06F 16/35* (2019.01)
*G06F 16/951* (2019.01)
(Continued)

(52) U.S. Cl.
CPC ... *G06Q 30/0282* (2013.01); *G06F 16/24575* (2019.01); *G06F 16/35* (2019.01); *G06F 16/951* (2019.01)

(58) Field of Classification Search
None
See application file for complete search history.

(56) References Cited

U.S. PATENT DOCUMENTS

| | | | | |
|---|---|---|---|---|
| 10,817,670 | B2 * | 10/2020 | Galitsky | G06F 40/30 |
| 2008/0154883 | A1 * | 6/2008 | Chowdhury | G06F 3/0482 |
| | | | | 707/999.005 |

(Continued)

OTHER PUBLICATIONS

Tyler Dye, "Review Analysis: How to analyze customer & product reviews", www.getthematic.com/insights/review-analysis, (Year: 2020).
(Continued)

*Primary Examiner* — Tarek Chbouki
*Assistant Examiner* — Loan T Nguyen
(74) *Attorney, Agent, or Firm* — Ansari Katiraei LLP; Arman Katiraei; Sadiq Ansari

(57) ABSTRACT

A quality assessment system models product or service quality based on contextual relevance. A neural network generates a contextual relevance model that differentiates descriptive characteristics based on a modeled relevance of each descriptive characteristic to the product or service. The system filters reviews based on the contextual relevance model to retain filtered reviews that reference any of the first set of descriptive characteristics. The system generates theme clusters with an encoder. Each theme cluster groups a different subset of the filtered reviews based on an amount of semantic similarity between the different subset of reviews and the theme cluster. The system presents an interface with a first visualization and a second visualization. The first visualization graphically represents a sentiment expressed in reviews grouped to the first theme cluster, and the second visualization graphically represents a sentiment expressed in reviews groups to the second theme cluster.

19 Claims, 12 Drawing Sheets

(51) Int. Cl.
    *G06Q 30/0282*    (2023.01)
    *G06F 16/2457*    (2019.01)

(56) References Cited

U.S. PATENT DOCUMENTS

| | | | | |
|---|---|---|---|---|
| 2010/0050118 A1* | 2/2010 | Chowdhury | .......... | G06F 40/258 |
| | | | | 715/810 |
| 2015/0331563 A1* | 11/2015 | Chowdhury | .......... | G06F 3/0482 |
| | | | | 715/765 |
| 2018/0121043 A1* | 5/2018 | Chowdhury | .......... | G06F 40/258 |
| 2020/0250212 A1* | 8/2020 | Macartney | .......... | G06F 16/3328 |

OTHER PUBLICATIONS

Reviews.io, "In Reviews We Trust", www.reviews.io, (Year: 2022).
Rachel Wolff, "8 Great Tools to Perform Qualitative Data Analysis in 2022",https://monkeylearn.com/blog/qualitative-data-analysis-software, Sep. 29, 2021.

* cited by examiner

US 11,699,177 B1

SYSTEMS AND METHODS FOR AUTOMATED MODELING OF QUALITY FOR PRODUCTS AND SERVICES BASED ON CONTEXTUAL RELEVANCE

BACKGROUND

User reviews may be used to notify other users about experiences with a product or service, or to provide the seller or creator feedback about the product or service. Oftentimes, the reviews may be misleading or misused for other purposes. For instance, fake reviews may be generated to falsely promote a product or service. Users may also incorrectly penalize or promote a product or service by writing reviews to ancillary or irrelevant features or functionality of the product or service. Accordingly, it may be difficult to draw meaningful insights or conclusions from the user reviews without reference to other reviews and without context around the product or service.

DETAILED DESCRIPTION OF PREFERRED EMBODIMENTS

Figure 1:
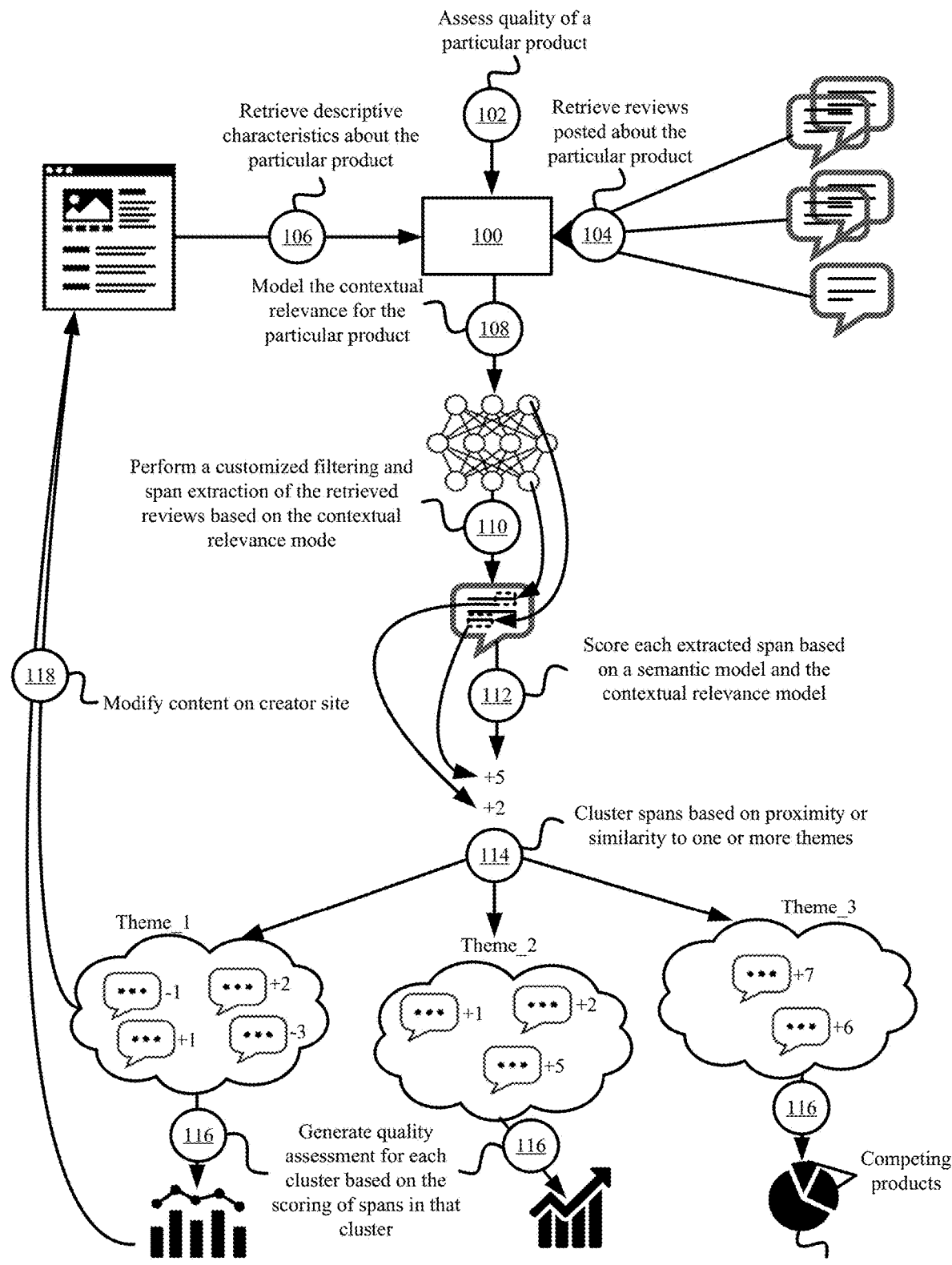
FIG. 1 illustrates an example of the automated modeling based on contextual relevance in accordance with some embodiments presented herein.

The following detailed description refers to the accompanying drawings. The same reference numbers in different drawings may identify the same or similar elements.

Provided are systems and methods for the automated modeling of quality for a product or service based on contextual relevance of the product, service, and/or associated reviews for the same product or service or for products or services of competitors. The systems and methods may use a combination of artificial intelligence and/or machine learning ("AI/ML") techniques to model the contextual relevance of the product, service, and/or associated reviews, and to customize the evaluation of similarly worded reviews for different products and services based on the modeled contextual relevance.

In some embodiments, the automated modeling may include automatically detecting relevant features of the reviewed product or service from the modeled contextual relevance. The relevant features derived from the contextual relevance may then be used to perform a customized filtering of the user reviews. The customized filtering may include retaining or prioritizing reviews associated with a product or service that are directed to the detected relevant features of that product or service, and discarding or deprioritizing reviews that are directed to irrelevant features or that are unrelated to the product or service. The customized filtering may further include differentiating between valid reviews and fake reviews by using the contextual relevance to identify machine-generated reviews or reviews that are created with a pattern or commonality that deviate from or violate the modeled contextual relevance.

In some embodiments, the automated modeling may apply the modeled contextual relevance to perform a customized scoring of the filtered reviews based on the sentiment expressed in each filtered review and also the degree with which each filtered review applies to the unique features, qualities, and/or other attributes that are modeled to have the most relevance to the product or service. In other words, the systems and methods may dynamically adjust the evaluation of similarly worded reviews for different products and services based on the different contextual relevance that is dynamically modeled for each product and service using the AI/ML techniques.

The automated modeling may generate actionable insights based on the customized review filtering and scoring that is performed on reviews of each product or service using the contextual relevance that is modeled for each product or service. In some embodiments, the actionable insights may include visualizations and/or interfaces that provide a comprehensive, qualitative, quantitative, and/or comparative assessment of the product or service quality. The visualizations and/or interfaces may be customized based on the modeled contextual relevance. For instance, the visualizations and/or interfaces may be dynamically generated to present textual spans from reviews that directly address contextually relevant features, qualities, or attributes that are dynamically determined from the modeling of the product or service, that compare the performance of the product or service with respect to the contextually relevant features, qualities, or attributes to competitor products or services, and/or that recommend changes to improve the quality of the product or service. The visualizations and/or interfaces may temporally align the filtered reviews to graphically illustrate the product or service quality over time with respect to the modeled contextual relevance and/or in relation to competitor products or services over time. In some embodiments, a different visualization or interface may be generated to present performance of a product or service with respect to each modeled topic of contextual relevance, and to isolate advantages or strengths of the product or service from disadvantages or weaknesses of the product or service.

In some embodiments, the actionable insights may include automatically controlling or modifying the content that is presented with the product or service. Automatically controlling or modifying the content may include changing the descriptive content presented with the product or service to emphasize or address the contextually relevant features, qualities, or attributes in the filtered reviews that are most frequently mentioned and/or are differentiating factors of competitors. Automatically controlling or modifying the content may include generating targeted content to distribute electronically or otherwise to different users, generating leads for sales agents, and/or controlling a marketing campaign to purchase advertisements, keywords, and/or other web or search engine enhancements that have the lowest cost and highest return-on-investment ("ROI") as determined from the contextually relevant filtered reviews.

FIG. 1 illustrates an example of the automated modeling based on contextual relevance in accordance with some embodiments presented herein. Quality assessment system 100 may receive (at 102) an instruction to assess the quality of a particular product. The instruction may be issued electronically over a data network using HyperText Transfer Protocol ("HTTP") and/or network messaging. The particular product may be identified by its name and/or other product identifiers (e.g., model number, serial number, etc.).

Quality assessment system 100 may activate one or more web crawlers to retrieve (at 104) reviews that users post to different online sites about the particular product. Quality assessment system 100 may activate the one or more web crawlers to also retrieve (at 106) descriptive characteristics about the particular product from the product originator site or content that the product originator has generated and disseminated through various sites selling or promoting the particular product.

Quality assessment system 100 may use one or more AI/ML techniques to model (at 108) the contextual relevance for the particular product from the retrieved (at 106) descriptive characteristics. Modeling (at 108) the contextual relevance may include identifying the important features, functionality, qualities, and/or other attributes of the particular product.

In some embodiments, the AI/ML techniques may be trained based on descriptive characteristics that are retrieved for other related products. In some such embodiments, the AI/ML, techniques may model (at 108) the contextual relevance of the particular product based on the recurrence or frequency with which a descriptive characteristic from the retrieved (at 106) descriptive characteristics is used to describe similar products. For instance, the AI/ML, techniques may differentiate between relevant and irrelevant descriptive characteristics for the similar products during the training phase and the recurrence of certain words in the descriptive characteristics of the related products. The AI/ML techniques may compare the retrieved (at 106) descriptive characteristics to the trained set of descriptive characteristics to evaluate the relevance of keywords, topics, features, qualities, and/or attributes that are used to describe the particular product. Accordingly, the contextual relevance model may be generated based on the frequency with which keywords, topics, features, qualities, and/or attributes describing the particular product are found or not found in the descriptions of similar products, and/or based on frequently used keywords, topics, features, qualities, and/or attributes describing other similar products that are also found in the retrieved (at 106) descriptive characteristics of the particular product.

In some embodiments, the contextual relevance may be modeled (at 108) based on the frequency with which certain words within the descriptive characteristics are repeated in the user reviews and/or other frequently recurring words in the user reviews that may not be found within the descriptive characteristics. For instance, a particular feature or functionality may not be considered important by the product creator, and therefore may not be mentioned in the descriptive characteristics. However, that particular feature or functionality may significantly impact the user experience such that the particular feature or functionality is mentioned in a large proportion of the user reviews. Accordingly, even though the product creator considers the particular feature or functionality to be irrelevant or unimportant, the volume of user reviews mentioning the particular feature or functionality may be used to increase the significance and/or relevance of that particular feature or functionality in the context relevance model.

Quality assessment system 100 may perform (at 110) a customized filtering and span extraction of the retrieved (at 104) reviews based on the contextual relevance model. In some embodiments, the customized filtering and span extraction may include using an attention-based encoder model to parse segments of text or parts of a review that pertain to a modeled feature, quality, and/or attribute of relevance for the particular product. Other segments or parts of reviews may be discarded or determined to have no impact on the assessment or evaluation of the particular product quality.

Quality assessment system 100 may score (at 112) the extracted spans based on a semantic model and the contextual relevance model. In some embodiments, a feedforward neural network may assign a value to each span based on the relevance of the topic expressed in the span, the frequency and/or ratio with which the topic occurs in the filtered reviews, and/or the semantic model mapping of the sentiment from the span to a range of values.

Quality assessment system 100 may cluster (at 114) spans based on proximity or similarity to a particular topic or theme, and may generate (at 116) a quality assessment for the topic or theme represented by each cluster based on the scoring of spans in that cluster. Each topic or theme may be representative of one or more related or similar features, qualities, attributes, and/or descriptive characteristics of the product or service. For instance, the different descriptive characteristics for taxes, invoicing, and payments may be grouped under the common theme of accounting or financial services. Generating (at 116) the quality assessment may include generating visualizations or interfaces that summarize the scoring of spans associated to a particular cluster and presenting the quality assessment in an alternative format.

Quality assessment system 100 may generate (at 118) actionable insights based on the quality assessment and spans clustered for a topic or set of topics. Generating (at 118) the actionable insights may include modifying content associated with the particular product, generating content for targeted marketing or promotion of the particular product, and/or providing comparative assessments of the particular product or entity that originates the particular product relative to competing products or competitors.

Figure 2:
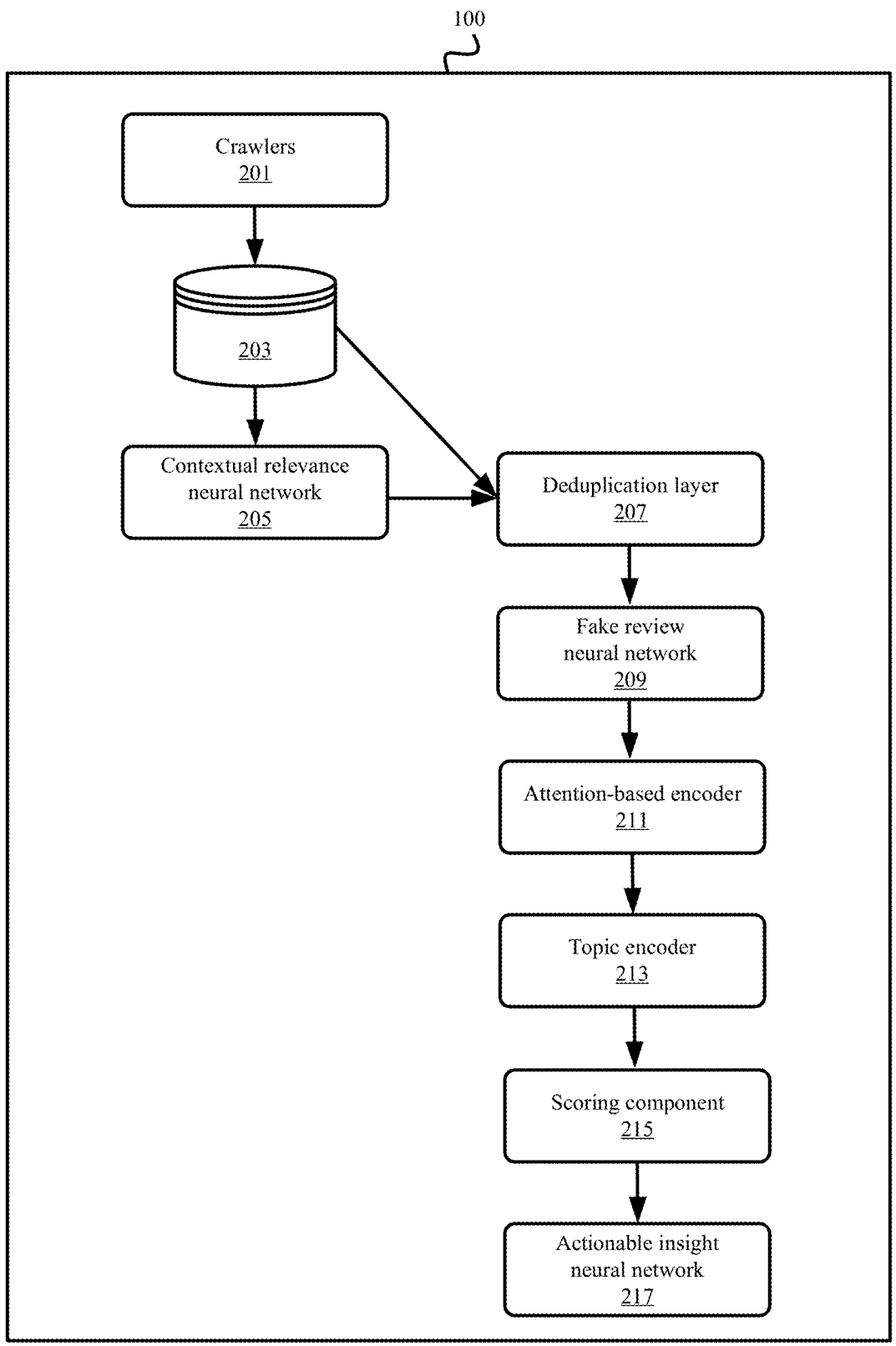
FIG. 2 presents an example architecture for the quality assessment system in accordance with some embodiments presented herein.

FIG. 2 presents an example architecture for quality assessment system 100 in accordance with some embodiments presented herein. Quality assessment system 100 may include one or more processors, devices, computers, or machines that implement crawlers 201, database 203, contextual relevance neural network 205, deduplication layer 207, fake review neural network 209, attention-based encoder 211, topic encoder 213, scoring component 215, and actionable insight neural network 217. In some embodiments, quality assessment system 100 may include additional, fewer, or different components.

Crawlers 201 may include devices or code executed by one or more machines or devices for accessing different network sites and for scraping or extracting different content from the accessed network sites. In some embodiments, crawlers 201 may be configured with a list of Uniform Resource Locators ("URL"), network addresses (e.g., Internet Protocol ("IP") addresses), and/or other network identifiers for requesting and/or accessing the network sites. The network sites may include one or more review sites that contain reviews about a particular product or service of interest, and one or more source sites containing content that is generated by the particular product or service creator and that describes the particular product or service. The review sites may include sites that sell the particular product or service, that include professional reviews of the particular product or service, provide forums for users to discuss the particular product or service, and/or that otherwise contain user-generated content relating to the particular product or service. The source sites may include sites of the particular product or service creator and/or sites that describe the particular product or service based on content that is generated by the particular product or service creator.

In some other embodiments, crawlers 201 may self-configure based on an identifier that identifies the particular product or service. For instance, a user may submit the name or link to a product. Crawlers 201 may perform searches based on the submitted name or link to identify the review sites that contain reviews of the product, and the source sites that contain the content generated by the product creator.

Crawlers 201 may issue HTTP GET requests or other requests to access each of the review sites and source sites. Crawlers 201 may parse the content on the accessed sites to identify reviews within the review sites pertaining to the particular product or service and descriptive characteristics of the particular product or service from the source sites. Crawlers 201 may download and store the reviews (e.g., user-generated content) for the particular product or service and the descriptive characteristics (e.g., creator-generated content) describing the particular product or service in database 203. Crawlers 201 may avoid downloading reviews for other products or services from the review sites, and/or descriptions of other products or services from the source sites.

The reviews may include text, numerical values, ratings, approvals and disapprovals (e.g., likes and dislikes), surveys, and/or other formats with which different users may express different degrees of sentiment to the reviewed product or service or different aspects of the reviewed product or service. The descriptive characteristics may identify features, qualities, and/or other attributes of the reviewed product or service and/or selling points of the reviewed product or service that are highlighted or referenced in the source sites. For instance, the descriptive characteristics may describe functionality, usage, outputs, benefits, advantages, pricing, and/or other elements of a product that the product originator has determined to be relevant or important to the particular product.

In some embodiments, crawlers 201 may retrieve the reviews and descriptive characteristics for a particular product or service in response to a user request for a quality assessment of the particular product or service/. In some other embodiments, crawlers 201 may continuously run and may periodically scrape the same review sites and source sites for new or updated reviews and/or descriptive characteristics for a set of products or services.

In some embodiments, crawlers 201 may identify one or more competing or similar products, and may also download or retrieve the reviews and descriptive characteristics of the competing or similar products for comparative purposes. Crawlers 201 may identify the one or more competing or similar products when searching for a particular product or when tasked with assessing the quality of the particular product.

Crawlers 201 may store the downloaded or retrieved reviews and descriptive characteristics to database 203. Database 203 may include different records for different products or services, and may populate the record of the particular product with the reviews and descriptive characteristics retrieved for that particular product.

Contextual relevance neural network 205 may use one or more AI/ML techniques to isolate the relevant keywords and/or topics from the descriptive characteristics extracted from the one or more source sites. Contextual relevance neural network 205 may automatically differentiate between words within the one or more source sites that are descriptive of relevant functionality, features, qualities, and/or other attributes of the particular product or service from other words that may be descriptive but unrelated to functionality, features, qualities, and/or other attributes of the particular product or service. For instance, a source site may include first descriptive characteristics reciting "best-in-class and most comprehensive suite of services" and second descriptive characteristics reciting "improved tool with 20% better accuracy". Contextual relevance neural network 205 may determine that the first descriptive characteristics are unrelated to any specific functionality, features, quality, or attribute of the particular product, whereas the second descriptive characteristics are related or relevant.

In some embodiments, contextual relevance neural network 205 may be trained based on descriptive characteristics from source sites of products or services that compete with, are alternatives to, or are similar to the particular product or service. Contextual relevance neural network 205 may detect words or phrases that are repeated or frequently found in the descriptive characteristics of the similar products, and may develop a model of potentially relevant features, qualities, and/or other attributes for the particular product based on the detected commonality or frequency. Accordingly, contextual relevance neural network 205 may use feed forward neural networks, recurrent neural networks ("RNN"), long short term memory networks ("LSTM"), convolutional neural networks ("CNN") and/or transformer-based encoders to determine the relevance of features, functionality, qualities, attributes, and/or other descriptive words to different classes of products. For instance, if 80% of the source sites include descriptive characteristics describing a first feature and only 10% of the source sites include descriptive characteristics describing a second feature, contextual relevance neural network 205 may detect the patterns and may determine that the first feature is relevant feature for the particular class of products, whereas the second feature is not a relevant feature for the particular class of products.

The modeling may be biased based on a semantic association. For instance, contextual relevance neural network 205 may determine a distance vector between a descriptive characteristic and the product or class of products. For instance, the words "sound" and "tone" have a close semantic association with musical instruments, and a distant semantic association with furniture. Conversely, the words "ergonomic", "weight", and "color" may have a close semantic associated with furniture, and a distant semantic association with musical instruments. Accordingly, contextual relevance neural network 205 may improve the modeling of potentially relevant descriptive characteristics for the particular product based on the semantic association determined between each descriptive characteristic and the particular product or service or the class of products or services.

The modeling may also be biased based on the frequency with which words, phrases, and/or descriptive characteristics appear in user reviews. In other words, contextual relevance neural network 205 may validate the relevance of a descriptive characteristic found on competitor source sites when that descriptive characteristic is also mentioned in a large number of user reviews. Similarly, contextual relevance neural network 205 may detect new words or phrases that gain contextual relevance when those words or phrases frequently appear in the user reviews of the competing products but are not found in the source sites of the same competing products. In this case, the product creators may overlook the significance of a particular feature that makes a class of products unusable or becomes a widely used feature within the class of products. By incorporating the user reviews into the contextual relevance modeling, contextual relevance neural network 205 may be able to automatically detect and differentiate the particular feature as a relevant feature for assessing the quality of a product within that class of products.

Contextual relevance neural network 205 may provide the descriptive characteristics that are extracted from the source sites as inputs into the model, and the model may output the words or phrases from the inputted descriptive characteristics that are determined to be relevant for the particular product. In some embodiments, the output may include an impact score for each descriptive characteristic (e.g., word or phrase) that indicates the degree of certainty or weight with which that descriptive characteristic impacts (e.g., is relevant to) the quality assessment of the particular product. In some embodiments, the model may be defined as a set of vectors for potentially relevant descriptive characteristics, and the output may identify descriptive characteristics that are scraped from the source sites of the particular product and that match to one or more of the potentially relevant descriptive characteristics as well as the impact score associated with each matching vector.

Deduplication layer 207 may implement an AI/ML technique that trains a language model on a contrastive learning object to determine whether two or more reviews are duplicates of one another. In some embodiments, the contrastive learning object may include training the language model with the structural patterns of duplicate reviews. For instance, the structural patterns used to train the language model may identify a duplicate review as a review with the same sentences as another review but in a different order. The structural patterns used to train the language model may identify a duplicate review as a review that swaps nouns, verbs, or adjectives with synonyms such that the content and structure of the duplicate review is identical to another review but for the substituted but related wording. The structural patterns may also identify parts of a review that are rewritten using open source or commercial off-the-shelf generative paraphrasing models.

In some embodiments, deduplication layer 207 may automatically define the structural patterns from examples of duplicate review. For instance, the examples of duplicate reviews may be provided as inputs to the language model, and the language model may compare the sentence structure, phrasing, ordering, word usage, and/or other properties of the duplicate reviews in order to automatically the structural patterns for the duplicate reviews.

Figure 3:
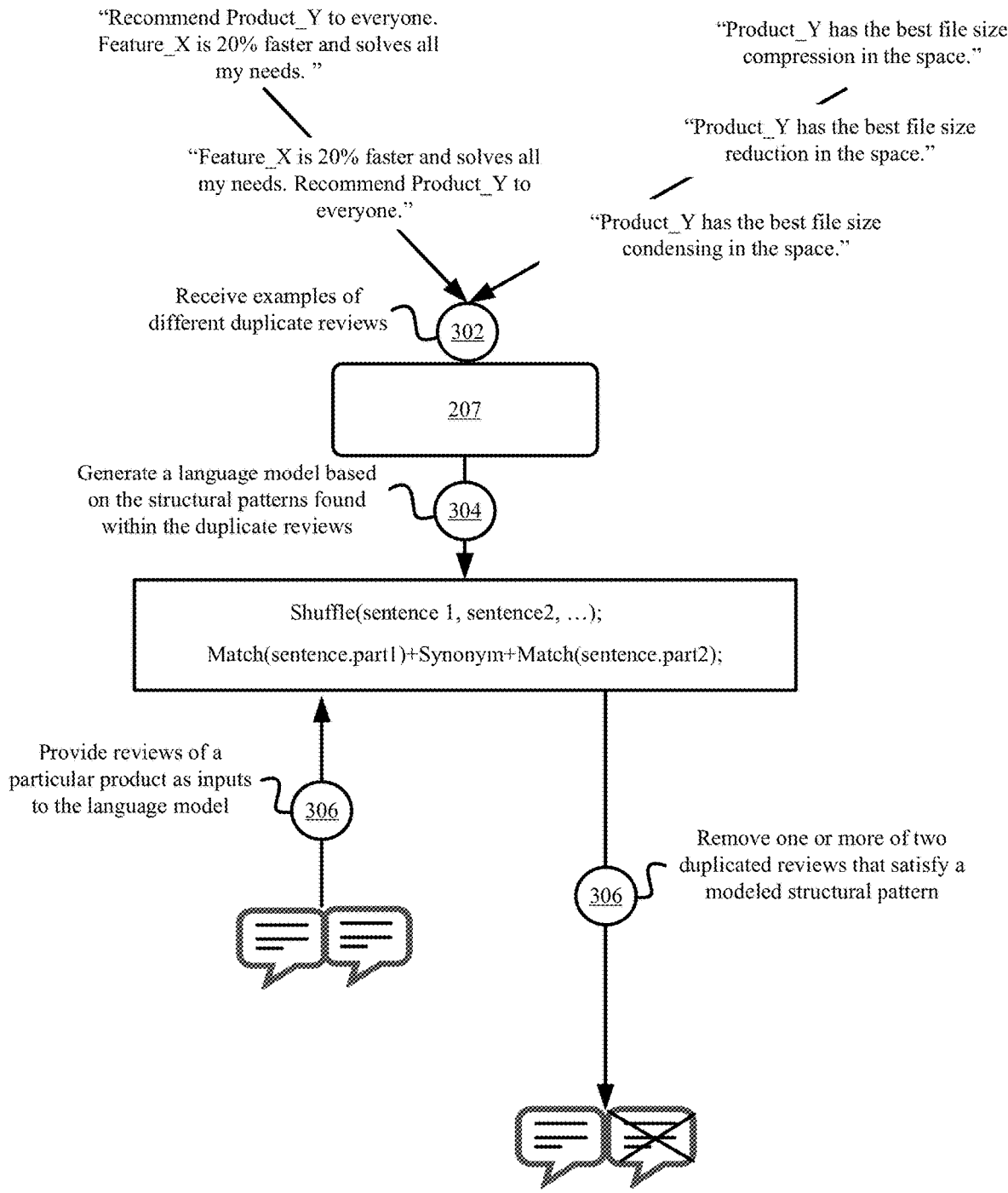
FIG. 3 illustrates an example of detecting and removing duplicate reviews in accordance with some embodiments presented herein.

FIG. 3 illustrates an example of deduplication layer 207 detecting and removing duplicate reviews in accordance with some embodiments presented herein. As shown in FIG. 3, deduplication layer 207 may receive (at 302) examples of different duplicate reviews that appear to be different reviews, may detect the structural pattern based on the commonality detected in the wording, phrasing, sequencing, and/or other aspects of each pair of reviews provided as an example of duplicate reviews, and may generate (at 304) the language model based on the structural patterns found within the duplicate reviews. In some embodiments, deduplication layer 207 may receive (at 302) the structural patterns as input, and may generate (at 304) the language model based on the received structural patterns.

Deduplication layer 207 may provide (at 306) the reviews retrieved for a particular product as inputs into the language model. Deduplication layer 207 may compare different pairs of reviews to determine if any two reviews satisfy a modeled structural pattern. Deduplication layer 207 may eliminate, discard, or remove (at 308) one or more of two reviews that satisfy a modeled structural pattern since the reviews are determined to be duplicates, and therefore fraudulently created or machine-generated.

Fake review neural network 209 may be used to detect and remove other fake reviews that may falsely contribute to the quality assessment. Fake review neural network 209 may be trained based on the contextual relevance model and/or may evaluate the reviews for a particular product based on the contextual relevance model. Specifically, fake review neural network 209 may use the contextual relevance model developed for the particular product to perform a customized filtering that detects and removes reviews that do not directly reference any of the modeled relevant features, qualities, attributes, and/or other descriptive characteristics for the particular product in the contextual relevance model. For instance, a fake review may include a review stating "this is the best product" without providing any meaningful reference to a modeled descriptive characteristic of the particular product or without directly identifying the particular product. Other fake reviews may include random, irrelevant, and/or generic text that may apply to any product or service.

In some embodiments, fake review neural network 209 may be trained based on reviews of other unrelated products. In some such embodiments, fake review neural network 209 may determine when a review from an unrelated product is being repurposed or reused for the particular product.

Accordingly, deduplication layer 207 and fake review neural network 209 may filter out reviews that are predicted with a threshold level of confidence or certainty by one of deduplication layer 207 and fake review neural network 209 to be a duplicate review, fake review, generic review, and/or another review that is unrelated to the contextual relevance model of the particular product.

Attention-based encoder 211 may use one or more AI/ML techniques to perform a topic-wise span extraction of relevant text from the filtered reviews, and to perform a sentiment classification of the extracted spans. A span may include a subset of text within a review that captures a single distinct topic of discussion. A span may be a short phrase or an entire review. A topic may correspond to one of the modeled descriptive characteristics for the particular product or service or the creator of that particular product or service. For instance, a topic may refer to a feature, quality, or attribute of the particular product (e.g., a user interface) or a provided service (e.g., onboarding) of relevance. The sentiment classification may include quantifying or scoring the sentiment expressed in each span and/or the impact of the span to the overall quality assessment based on the specificity of the span, the importance of the descriptive characteristics referenced in the span, and the sentiment used in conjunction with the descriptive characteristics.

Figure 4:
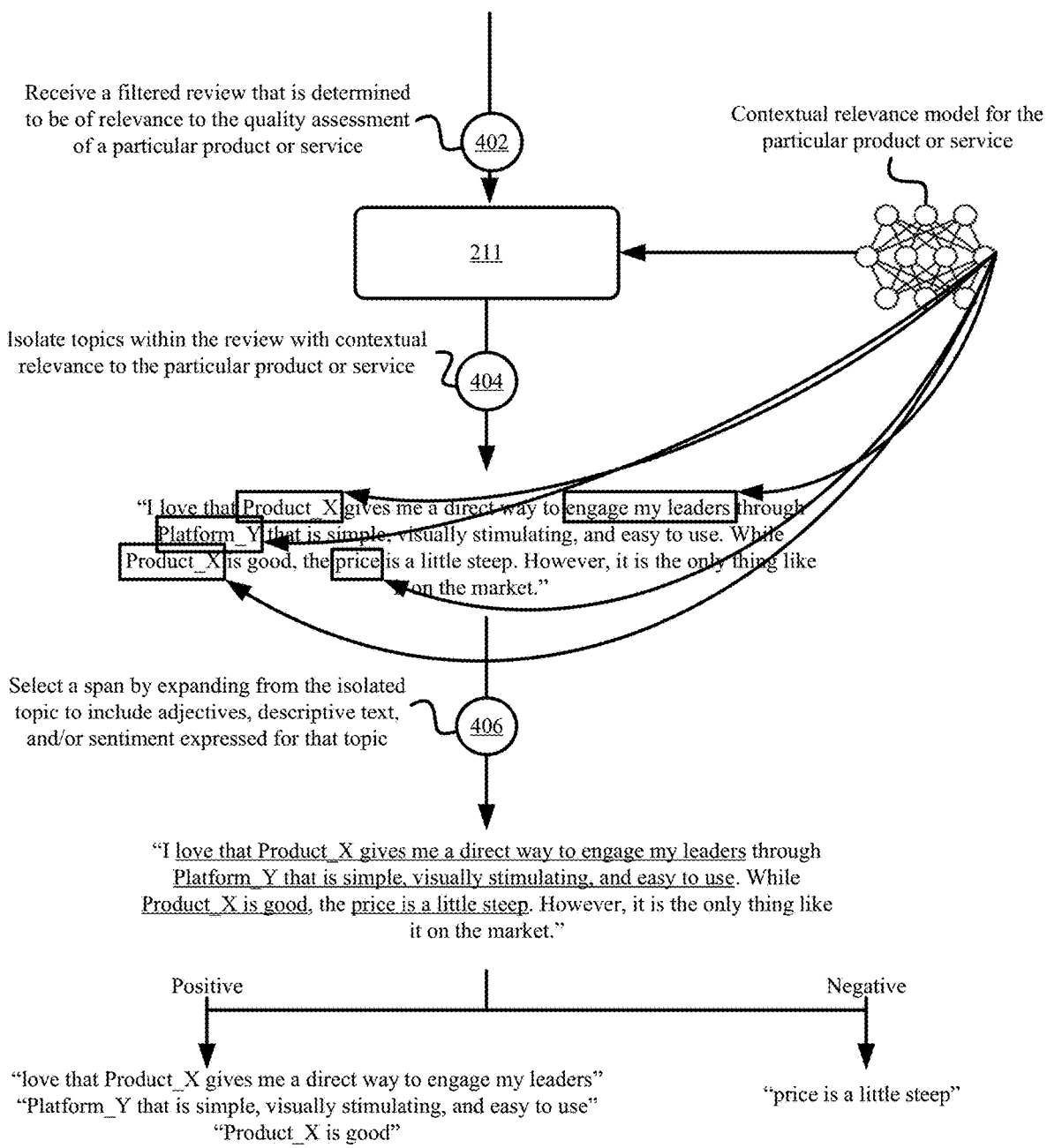
FIG. 4 illustrates example operation of the attention-based encoder in accordance with some embodiments presented herein.

FIG. 4 illustrates example operation of attention-based encoder 211 in accordance with some embodiments presented herein. Attention-based encoder 211 may receive (at 402) one or more filtered reviews that are determined to be of relevance to the quality assessment of a product or service. Attention-based encoder 211 may evaluate the review structure to isolate (at 404) different topics within the review. The different topics may correspond to references to the product or service name as well as features, qualities, attributes, and/or other descriptive characteristics of the product or service that are included as part of the contextual relevance model.

Once a topic is isolated, attention-based encoder 211 may select (at 406) a span by expanding from the isolated topic to include adjectives, descriptive text, and/or sentiment expressed for that topic. The span expansion may ignore punctuation or syntax as some reviews may be written without proper punctuation, grammar, and/or formatting. As shown in FIG. 4, four different spans corresponding to the four different underlined segments of the review may be identified by attention-based encoder 211. In this manner, attention-based encoder 211 may filter individual reviews to retain the relevant parts of the reviews while discarding the irrelevant parts that do not contribute to the quality assessment of the reviewed product or service.

Attention-based encoder 211 may pass the extracted spans through a feedforward neural network. The feedforward neural network may be trained to classify (at 408) different words or phrasing as providing positive, negative, or neutral sentiment. For instance, if a span has a negative sentiment that is directed to challenges that the product may effectively solve, and not the product itself, the feedforward neural network may label the span as neutral (e.g., "We struggled with managing financial transactions until we started using Product X."). Accordingly, the sentiment classification is not based solely on the positivity or negativity associated with a particular word, but how the particular word is used in the span and/or the topic being referenced by the particular word. As shown in FIG. 4, the spans that are classified with a positive sentiment are differentiated from the spans that are classified with a negative sentiment. In some embodiments, different coloring may be used to differentiate the spans with the different sentiment classifications. In some embodiments, the sentiment classification may include providing a score or scalar value to quantify the amount of positivity or negativity associated with each span.

The extracted spans with the sentiment classifications may pass from attention-based encoder 211 to topic encoder 213. Topic encoder 213 may output similar encodings for spans referencing similar topics. In other words, topic encoder 213 may cluster the spans that reference the same or similar topics.

The encodings generated by topic encoder 213 may be a representation of text in the form of a real-valued vector that encodes the meaning of the text within an extracted span such that two pieces of text from different spans that are closer in the vector space are expected to be similar in meaning or directed to a similar topic. In some embodiments, the vectors may be defined based on semantic similarity between the descriptive characteristics in the spans.

Topic encoder 213 may use word embedding techniques (e.g., Word2Vec, GLoVe, etc.) and/or phrase encoding techniques (e.g., RNN, LSTM, CNN, transformer-based encoder, etc.) to determine the semantic similarity between the descriptive characteristics in the extracted spans. The NLP techniques may compute a distance metric that measures proximity between the descriptive characteristics and different word vectors in a vector space (e.g., Euclidean distance, cosine similarity, etc.). Specifically, the distance metric may be a measure of the linguistic, semantic, and/or contextual similarity of the descriptive characteristics and/or word vectors to other descriptive characteristics. Descriptive characteristics with greater similarity may be clustered closer together. For instance, topic encoder 213 may determine that the descriptive characteristic of "encoding" has more semantic similarity to the descriptive characteristic of "encrypting" than "cropping", and "cropping" has more semantic similarity with "editing" than "encoding" based on a first frequency with which "encoding" and "encrypting" are used in the same contexts, and a second frequency with which "encoding" and "cropping" are used in the same contexts From the clustering, topic encoder 213 may determine the most frequently recurring themes in the reviews. A theme may be a collection of closely related topics and may encompass a set of closely-related features, qualities, attributes, and/or other descriptive characteristics of the product, service, or entity providing the product or service. The theme may be selected based on a word or phrase that is determined to have the greatest semantic similarity to each of the descriptive characteristics in a cluster. In some embodiments, one descriptive characteristic within a cluster may be selected as the theme. In some other embodiments, the theme may be new word or phrase that represents or is associated with the greatest number of the descriptive characteristics in a cluster.

Figure 5:
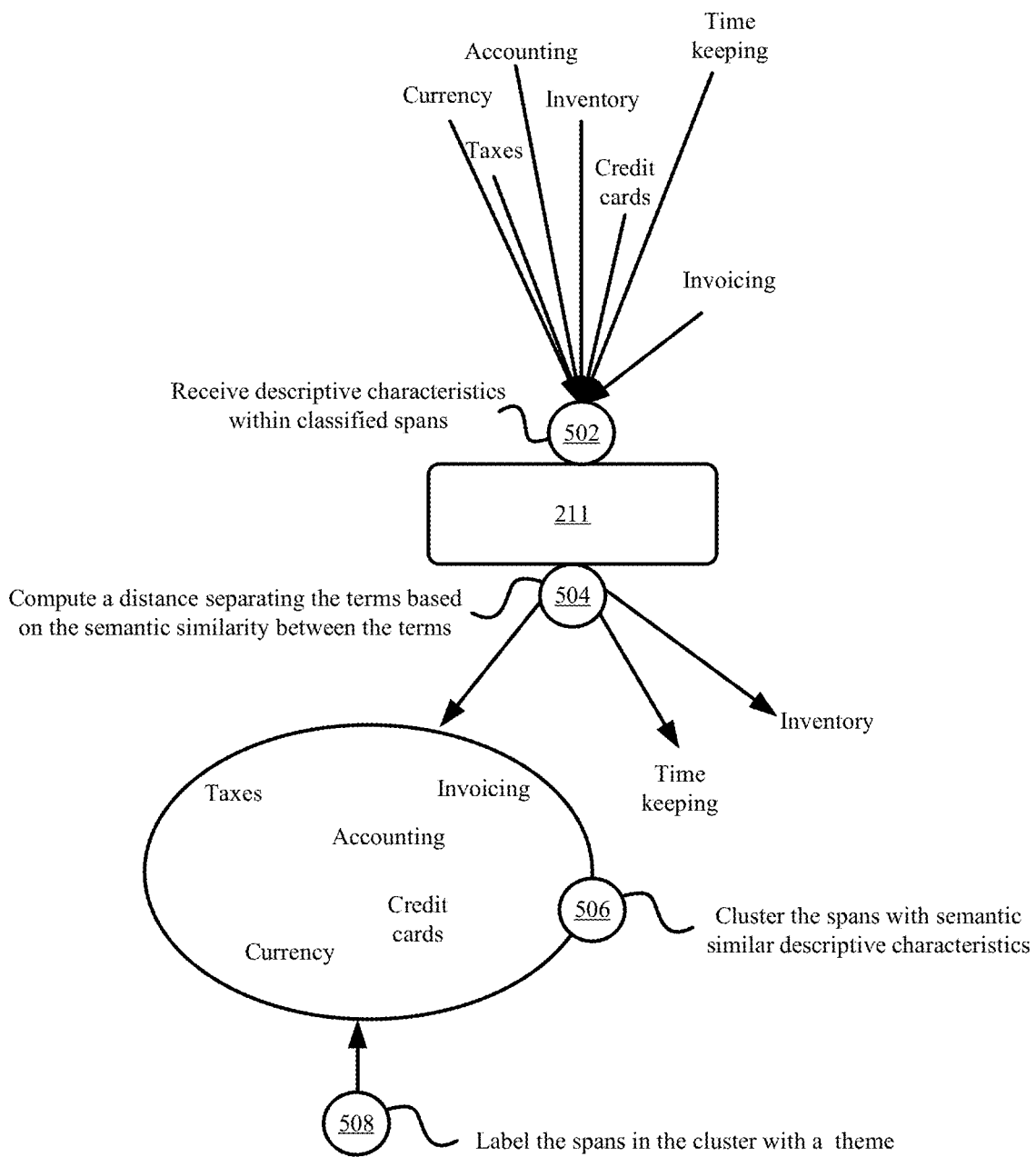
FIG. 5 illustrates an example of generating a particular theme cluster in accordance with some embodiments presented herein.

FIG. 5 illustrates an example of topic encoder 213 generating a particular theme cluster in accordance with some embodiments presented herein. Topic encoder 213 may receive (at 502) spans with descriptive characteristics including currency, taxes, accounting, invoicing, credit cards, inventory, and time keeping. Topic encoder 213 may compute (at 504) a distance separating the descriptive characteristics based on the semantic similarity between the descriptive characteristics. Topic encoder 213 may determine that the descriptive characteristics of currency, taxes, accounting, invoicing, and credit cards are related or are separated by less than a threshold distance, and may group (at 506) the spans including these descriptive characteristics in a common cluster. Topic encoder 213 may determine a theme label for each cluster of two or more spans based on the semantically similar descriptive characteristics in that cluster, and may associate (at 508) the theme label to the cluster in order to uniquely identify the cluster from other clusters. In some embodiments, the same span may be included two or more differently labeled clusters.

Scoring component 215 may receive the themes generated by topic encoder 213, and may compute a score for each theme based on the constituent spans associated with each theme and the sentiment classification associated with each span. In some embodiments, the score of each theme may be defined by the distribution of positively and negatively classified spans associated with that theme. In some embodiments, scoring component 215 may calculate the lower bound of the Wilson score confidence interval for a Bernoulli parameter. In some such embodiments, scoring component 215 may reward higher rates of positive to negative mentions, and may penalize a lower volume of mentions or spans associated with a theme. For instance, a first theme associated with 10 spans and a 75% positive span ratio may be receive a lower overall score than a second theme associated with 100 spans and a 70% positive span ratio.

Figure 6:
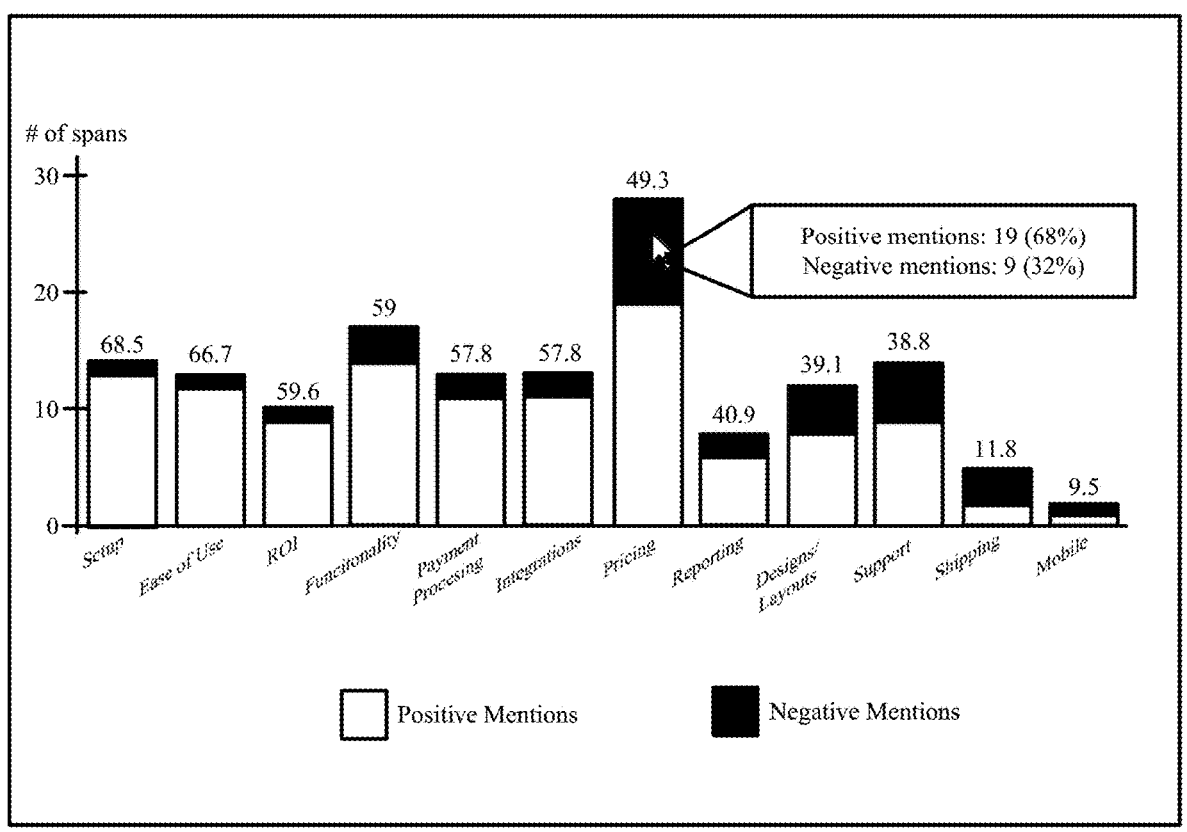
FIG. 6 illustrates an example visualization or interface that is generated based on the theme scoring in accordance with some embodiments presented herein.

Actionable insight neural network 217 may generate the various visualizations and/or interfaces based on the scored themes. FIG. 6 illustrates an example visualization or interface 600 that is generated by actionable insight neural network 217 based on the theme scoring provided by scoring component 215 in accordance with some embodiments presented herein.

Interface 600 may present the different themes that were scored by scoring component 215 along the x-axis, and a score for each theme that is derived based on the number of positively and negatively classified spans associated with each theme along the y-axis. As shown in FIG. 6, the scoring of each theme is based on the ratio of spans with positive and negative sentiment clustered under a particular theme, and also the number of spans that are clustered under a particular theme. Accordingly, interface 600 may identify the most mentioned themes based on the scoring and visual representation provided for each theme. Specifically, the visual representation notifies a user of the most mentioned themes and/or the features, qualities, or attributes that are most often discussed or most important to users.

In some embodiments, interface 600 may include interactive elements. For instance, if a user moves a pointer over the score for a particular theme, interface 600 may dynamically present the number of spans with positive and negative sentiment from which the score was derived.

Figure 7:
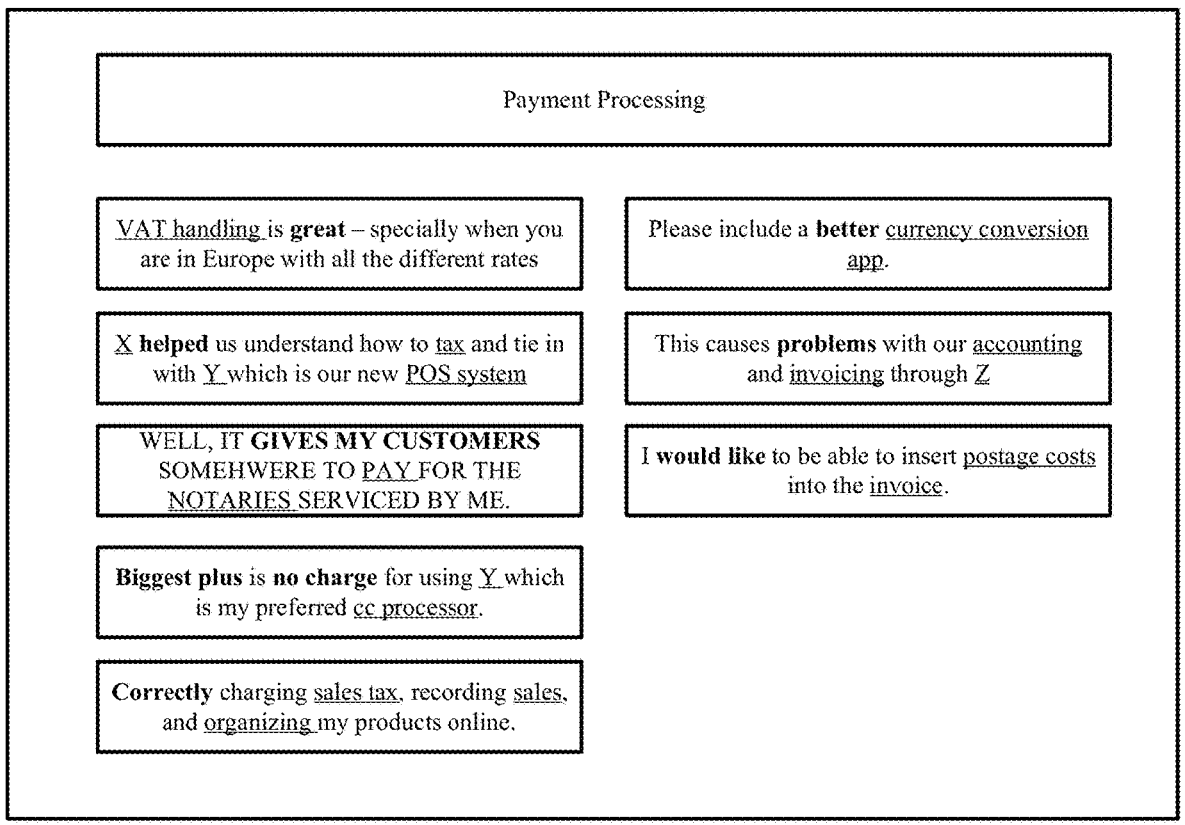
FIG. 7 illustrates an example interface that is presented in response to a user selecting a score visualization in accordance with some embodiments presented herein.

Additionally, the user may click or otherwise select a scored theme, and interface 600 may respond by presenting the spans clustered under that theme. FIG. 7 illustrates an example interface 700 that is presented in response to a user selecting the score visualization for the "Payment Processing" theme in accordance with some embodiments presented herein.

As shown in FIG. 7, interface 700 present the text from each of the spans that were clustered as part of the "Payment Processing" theme. Interface 700 may arrange the spans so that the spans with positive classifications are on the left side and the spans with the negative classifications are on the right side. In some embodiments, the spans in interface 700 may be enhanced to highlight the descriptive characteristics that led to the "Payment Processing" theme classification and/or that led to a positive or negative sentiment classification.

In some embodiments, scoring component 215 and/or actionable insight neural network 217 may modify the scoring based on timestamps associated with each review and/or span. In some such embodiments, the reviews may be aggregated with timestamps that indicate the date and time at which a review was posted to a review site. Scoring component 215 may map the review timestamps to the spans that are extracted from the timestamped reviews, and may generate historical scores for each theme based on the timestamps associated with the spans clustered under that theme. For instance, scoring component 215 may generate a monthly score for a particular theme based on clustered spans that fall within the different monthly time windows. The historical scores allow a user to see how different themes trend over time, whether user perception of a theme improves or declines over time, and/or whether changes implemented with respect to a theme have a desired effect.

Figure 8:
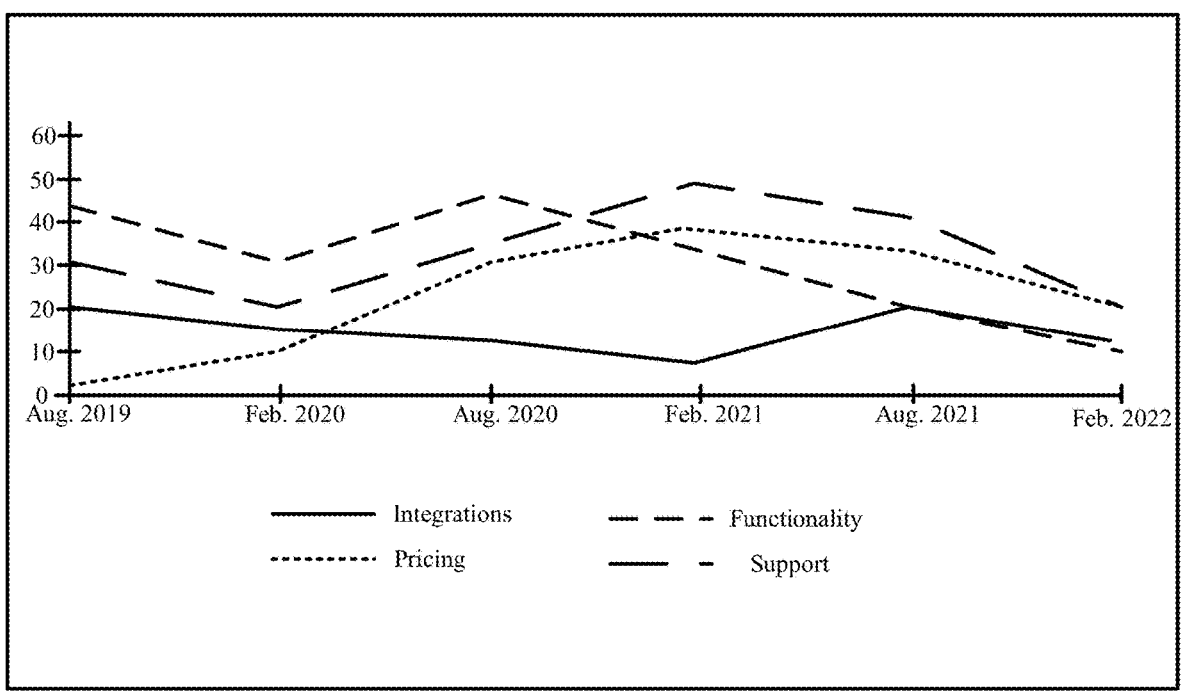
FIG. 8 illustrates an example visualization or interface that is generated based on the historical scoring of different themes in accordance with some embodiments presented herein.

FIG. 8 illustrates an example visualization or interface 800 that is generated by actionable insight neural network 217 based on the historical scoring of different themes by scoring component 215 in accordance with some embodiments presented herein. Interface 800 graphically presents the change in sentiment for different themes over time and/or the change in the volume of mentions for each theme over time. Each plotted line may represent the score for a different theme.

Interface 800 may be interactive. A user may select any point along a plotted theme line in order to obtain detailed information about the theme score at a corresponding point in time. The presented score may be selected, and interface 800 may present each of the spans that were received for the selected theme and that have timestamps in range of the selected point in time.

In some embodiments, a user may select a point in time along the x-axis of interface 800, and interface 800 may present numerical scores for all presented themes at that selected point in time. Graphical elements may be used to customize which themes are presented in interface 800.

Actionable insight neural network 217 may analyze the scored themes to automatically derive additional insights and/or to perform automated actions including the automated generation of content for the source site, targeted marketing of the particular product or services to potential users, and/or other changes affecting the distribution or promotion of the particular product or service.

In some embodiments, actionable insight neural network 217 may derive additional insights based on a comparative analysis of a product or service to competing products or services or a product/service creator to competitors. The additional insights may include accurately identifying the closest competition as well as performance of the competition to the product/service creator or specific products or services offered by the product/service creator.

Figure 9:
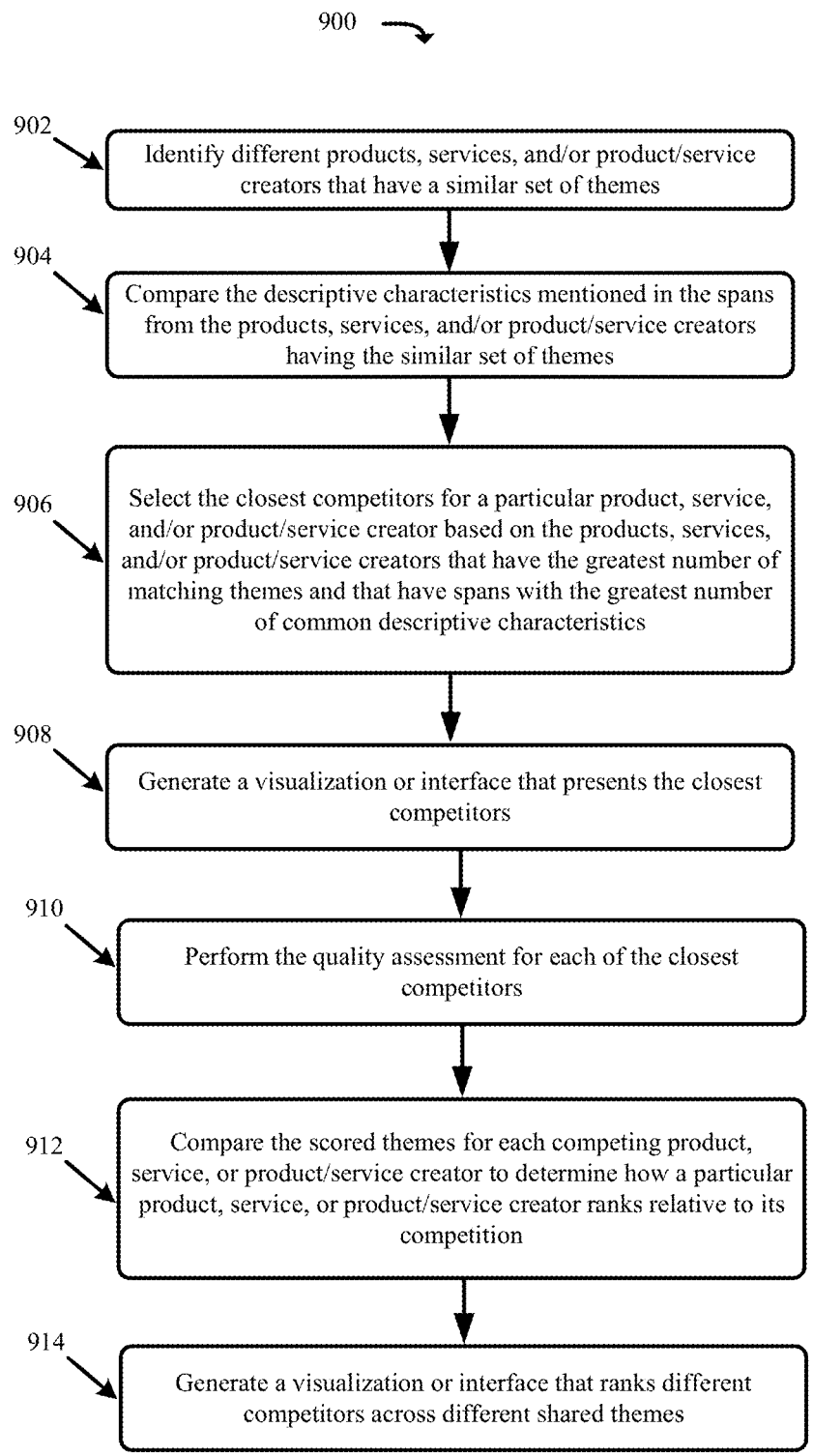
FIG. 9 presents a process for accurately identifying the closest competition for a product, service, or product/service creator based on comparative analysis of filtered spans in accordance with some embodiments presented herein.

FIG. 9 presents a process 900 for accurately identifying the closest competition for a product, service, or product/service creator based on comparative analysis of filtered spans in accordance with some embodiments presented herein. Process 900 may be implemented by quality assessment system 100 and/or actionable insight neural network 217 of quality assessment system 100.

Process 900 may include identifying (at 902) different products, services, and/or product/service creators that have a similar set of themes. Related products may receive feedback on similar features or have features that users compare and contrast in the reviews. Accordingly, the spans extracted from the reviews of the related products may be grouped to similar clusters or themes, and the generation of similar clusters or themes for different products or services may be used to identify competing products or services. The identification of the competitors may be supplemented or verified based on explicit mentions of competitors in the reviews or in source sites for competing products.

Process 900 may include comparing (at 904) the features, qualities, attributes, and/or descriptive characteristics mentioned in the spans from the products, services, and/or product/service creators having the similar set of themes. The comparison (at 904) may include determining the number or percentage of descriptive characteristics that the spans for the different products, services, and/or product/service creators have in common.

Process 900 may include selecting (at 906) the closest competitors for a particular product, service, and/or product/service creator based on the products, services, and/or product/service creators that have the greatest number of matching themes and that have spans with the greatest number of common descriptive characteristics. In some embodiments, a product, service, or product/service creator with themes and spans that satisfy a threshold number of matching themes and descriptive characteristics may be selected as a competitor.

Process 900 may include generating (at 908) a visualization or interface with which to present the closest competitors. The identification of the closest competitors may notify an entity of new competition, competition that is gaining popularity, and/or competition that was previously unknown. For instance, a user may view a first set of accounting software products as related, but the additional insights revealed by actionable insight neural network 217 may identify a second set of accounting software products that have a greater number of features in common in the aggregated reviews.

Actionable insight neural network 217 may generate additional insights from comparing a particular product, service, or product/service creator to its competition. Accordingly, process 900 may include performing (at 910) the quality assessment for each competitor. The quality assessment may include retrieving the reviews for each competing product, service, or product/service creator, filtering out the duplicate and/or fake reviews, extracting the relevant spans from the retained reviews, scoring the spans based on sentiment, clustering the spans under various themes, and scoring the themes.

Process 900 may include comparing (at 912) the scored themes for each competing product, service, or product/service creator to determine how a particular product, service, or product/service creator ranks relative to its competition. From the comparison, actionable insight neural network 217 may extract the spans that contributed to the strongest or weakest themes. For instance, a product may rank last relative to its competition on a first theme, and may rank first relative to its competition on a second theme.

Process 900 may include generating (at 914) a visualization or interface that ranks different competitors across different shared themes. For instance, actionable insight neural network 217 may present the negative spans clustered under the first theme to specifically list the features, qualities, attributes, and/or other descriptive characteristics that are weaknesses or that created an overall negative experience with the first theme of the particular product. Similarly, actionable insight neural network 217 may generate a visualization or interface that presents the positive spans clustered under the second theme to specifically list the features, qualities, attributes, and/or other descriptive characteristics that are strengths or that created an overall positive experience with the second theme of the particular product. Based on the presented insights, a user may take action to address the weaknesses identified in the visualization or interface.

Figure 10:
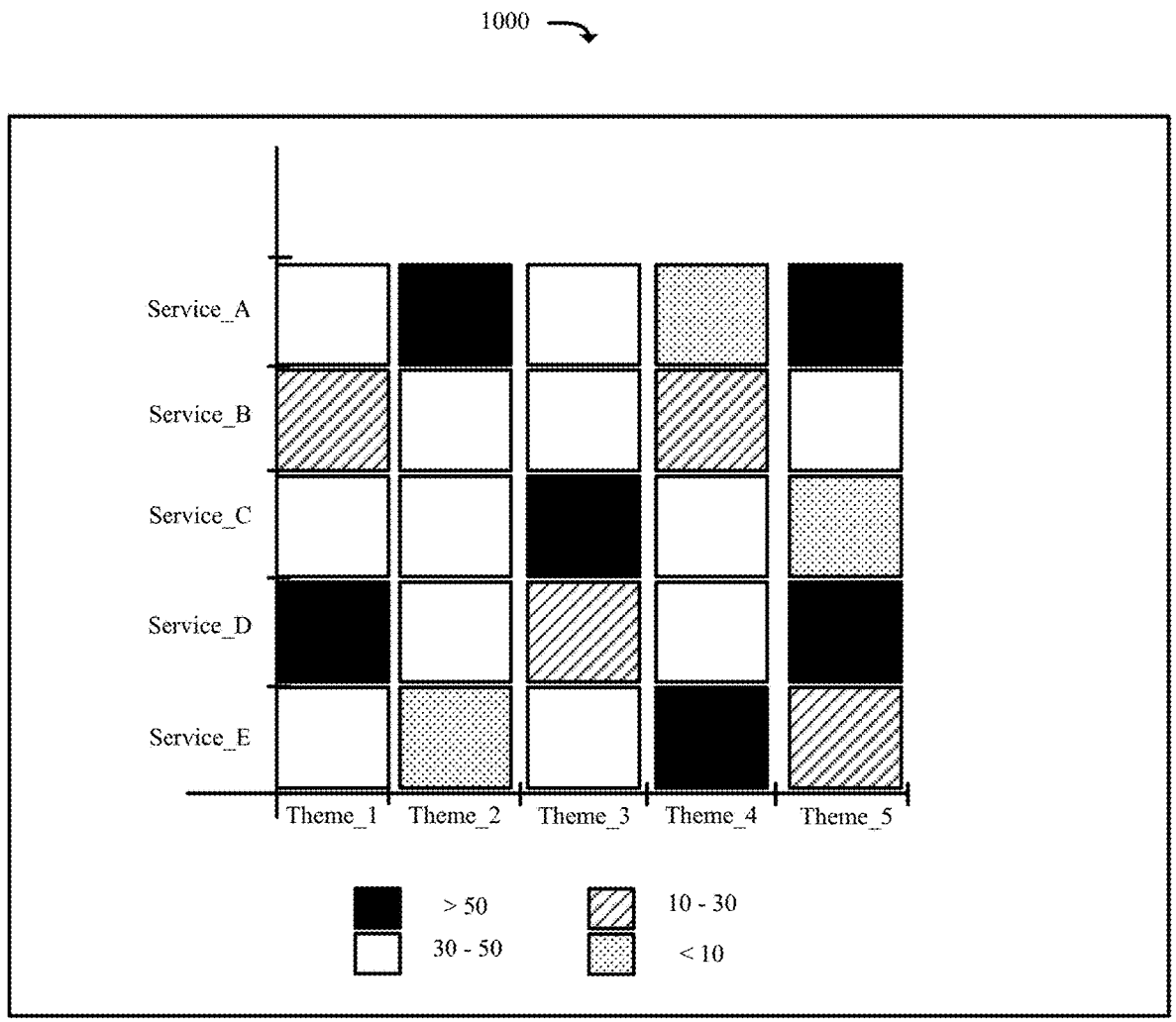
FIG. 10 illustrates an example interface for ranking a set of competitors across different themes in accordance with some embodiments presented herein.

FIG. 10 illustrates an example interface 1000 generated by actionable insight neural network 217 for ranking a set of competitors across different themes in accordance with some embodiments presented herein. The y-axis of interface 1000 may present different competing entities, products, and/or services, and the x-axis of interface 1000 may present different clusters or themes that the competitors were compared against. Interface 1000 may present visualizations or representation of the scores for each theme and for each competitor so that the best performing and worst performing entity, product, or service across each theme may be identified.

In some embodiments, actionable insight neural network 217 may perform automated actions to resolve an identified weakness or to capitalize on an identified strength. Different automated actions may be defined for different themes.

Figure 11:
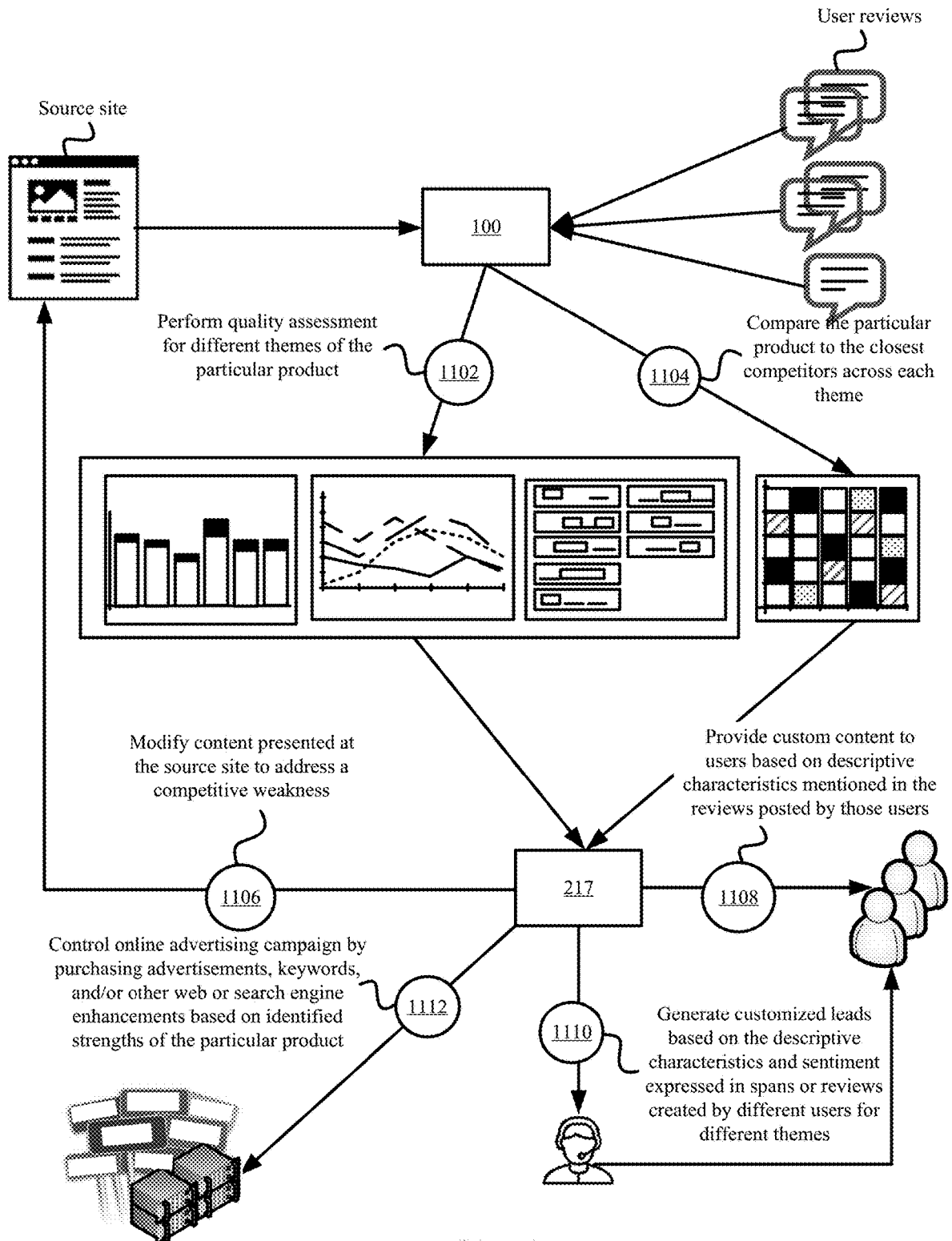
FIG. 11 illustrates examples of various automated actions performed by the quality assessment system in accordance with some embodiments presented herein.

FIG. 11 illustrates examples of various automated actions performed by quality assessment system 100 in accordance with some embodiments presented herein. As shown in FIG. 11, quality assessment system 100 may perform (at 1102) a quality assessment for different themes of a particular product, and may compare (at 1104) the quality assessment of the particular product to the quality assessment of competing products.

Performing (at 1102) the quality assessment may include generating the contextual relevance model for the particular product based on relevant descriptive characteristics extracted from one or more source sites and/or derived from aggregated user reviews, clustering spans from filtered reviews that are directed to descriptive characteristics or topics modeled within the contextual relevance model, associating a theme to each cluster, scoring the each cluster, and generating the various visualizations and/or interfaces that score the particular product across each of the themes, that capture the changes in each theme score over time, and/or that isolate the descriptive characteristics and sentiment in each span that contributes to one or more of the theme scores. Comparing (at 1104) the quality assessment may include determining how the particular product ranks to its closest competitors across the different themes.

Actionable insight neural network 217 may evaluate the scored themes, the changes to the scored themes, the isolated spans contributing to each of the scored themes, and/or strengths and weaknesses of the particular product relative to its competition in order to generate and/or implement different automated actions. The automated actions may be customized based on the descriptive characteristics and sentiment mentioned in the spans of a particular theme or cluster that is identified as a strength or weakness of the particular product.

The automated actions may include generating or modifying (at 1106) content at the source site or content that is presented to users on behalf of the source site. For instance, actionable insight neural network 217 may identify that a particular company ranks poorly relative to its competitors on pricing. Actionable insight neural network 217 may modify (at 1106) the source site to identify the value behind the pricing of its products or lower the pricing of one or more products or services.

The automated actions may include generating (at 1108) custom emails or marketing campaigns based on the descriptive characteristics and sentiment expressed in spans or reviews created by different users for different themes. The custom-generated content may offer discount codes to existing or potential customers when pricing is negatively mentioned in a threshold number of reviews or in response to the sentiment around pricing changing from positive to negative over time. Actionable insight neural network 217 may detect that reviews of a particular user frequently reference a first feature of the particular product. Actionable insight neural network 217 may generate custom content to send to the particular user based on the descriptive characteristics and/or sentiment mentioned in conjunction with the first feature in the particular user reviews. The first content may provide instructions or tutorials for improving usage of the first feature or for unlocking additional functionality associated with the first feature. The first content may include a promotion that allows the first user to use an upgraded or newer version of the first feature for a temporary period of time.

The automated actions may include generating (at 1110) customized leads for agents to reach out to potential customers based on the descriptive characteristics and sentiment expressed in spans or reviews created by different users for different themes. For instance, a user may extol or complain about a particular theme of a competitor product in an aggregated competitor review. Actionable insight neural network 217 may determine that the particular product ranks higher than the competitor product for the particular theme. Accordingly, actionable insight neural network 217 may generate (at 1110) a targeted lead for an agent of the particular product to reach out to the user and to focus on the advantages of the particular product relative to the competitor product around the particular theme.

The automated actions may include controlling (at 1112) an online advertising campaign associated with the particular product based on the quality assessment and/or comparative assessment. Controlling (at 1112) the online advertising campaign may include identifying the strengths of the particular product based on highest scored themes and/or descriptive characteristics of the particular product mentioned in the spans of the highest scored themes, determining semantically similar wording for the identified strengths, and purchasing advertisements, keywords, and/or other web or search engine enhancements based on the semantically similar wording that has the lowest cost.

Figure 12:
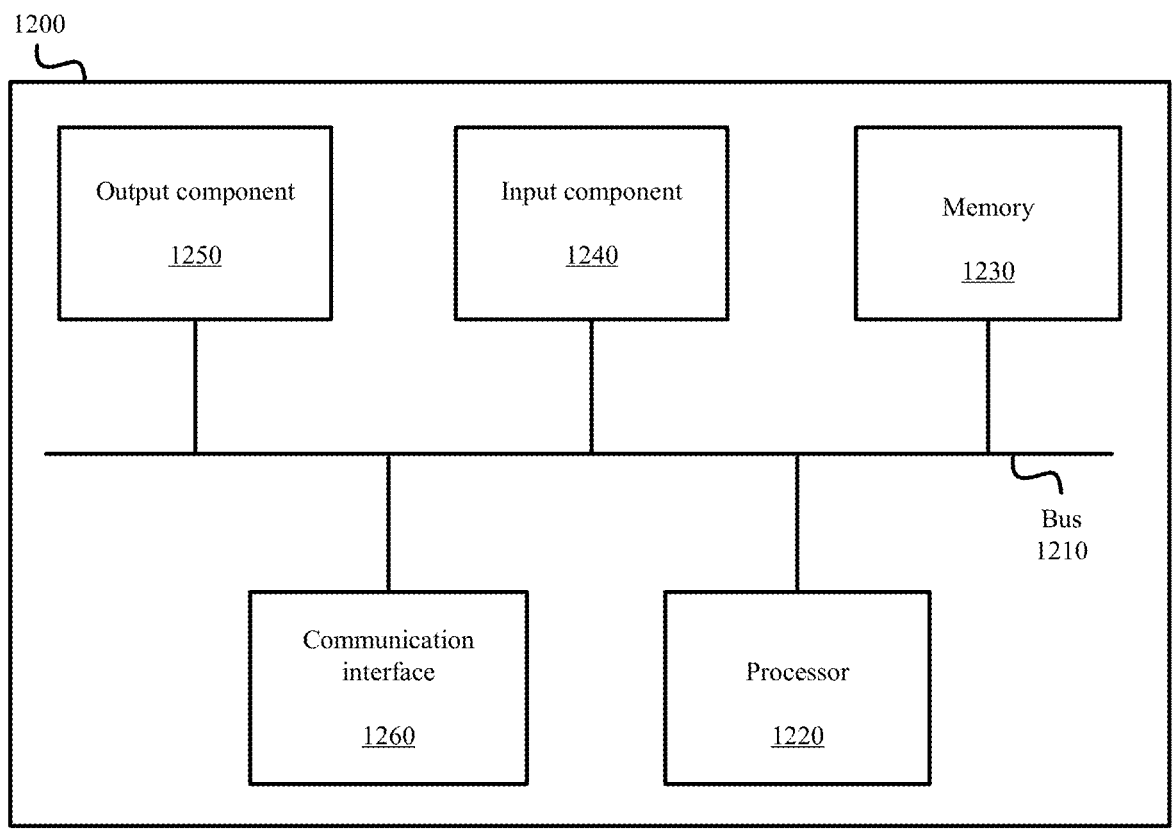
FIG. 12 illustrates example components of one or more devices, according to one or more embodiments described herein.

FIG. 12 is a diagram of example components of device 1200. Device 1200 may be used to implement one or more of the devices or systems described above (e.g., quality assessment system 100, crawlers 201, database 203, contextual relevance neural network 205, deduplication layer 207, fake review neural network 209, attention-based encoder 211, topic encoder 213, scoring component 215, and actionable insight neural network 217, etc.). Device 1200 may include bus 1210, processor 1220, memory 1230, input component 1240, output component 1250, and communication interface 1260. In another implementation, device 1200 may include additional, fewer, different, or differently arranged components.

Bus 1210 may include one or more communication paths that permit communication among the components of device 1200. Processor 1220 may include a processor, microprocessor, or processing logic that may interpret and execute instructions. Memory 1230 may include any type of dynamic storage device that may store information and instructions for execution by processor 1220, and/or any type of non-volatile storage device that may store information for use by processor 1220.

Input component 1240 may include a mechanism that permits an operator to input information to device 1200, such as a keyboard, a keypad, a button, a switch, etc. Output component 1250 may include a mechanism that outputs information to the operator, such as a display, a speaker, one or more LEDs, etc.

Communication interface 1260 may include any transceiver-like mechanism that enables device 1200 to communicate with other devices and/or systems. For example, communication interface 1260 may include an Ethernet interface, an optical interface, a coaxial interface, or the like. Communication interface 1260 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1200 may include more than one communication interface 1260. For instance, device 1200 may include an optical interface and an Ethernet interface.

Device 1200 may perform certain operations relating to one or more processes described above. Device 1200 may perform these operations in response to processor 1220 executing software instructions stored in a computer-readable medium, such as memory 1230. A computer-readable medium may be defined as a non-transitory memory device. A memory device may include space within a single physical memory device or spread across multiple physical memory devices. The software instructions may be read into memory 1230 from another computer-readable medium or from another device. The software instructions stored in memory 1230 may cause processor 1220 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
    retrieving a plurality of descriptive characteristics that describe attributes of a particular product or service and related products or services of competitors from source sites of the particular product or service and the competitors and from reviews of the particular product or service;
    generating a contextual relevance model with a neural network of a quality assessment system, wherein generating the contextual relevance model comprises modeling a relevance of each particular descriptive characteristic from the plurality of descriptive characteristics based on a recurrence of the particular descriptive characteristic in the reviews of the particular product or service and a number of the source sites that mention the particular descriptive characteristic, and wherein the neural network differentiates a first set of descriptive characteristics that are relevant to the particular product or service from a second set of descriptive characteristics that are irrelevant to the particular product or service based on a modeled relevance of each descriptive characteristic;
    filtering a plurality of reviews directed to the particular product or service based on the contextual relevance model, wherein filtering the plurality of reviews comprises retaining a first set of the plurality of reviews that reference one or more of the first set of descriptive characteristics, and discarding a second set of the plurality of reviews that do not reference one or more of the first set of descriptive characteristics;
    computing a distance separating descriptive characteristics of the first set of reviews in a vector space based on semantic similarity between the descriptive characteristics of the first set of reviews;
    generating a plurality of theme clusters with an encoder of the quality assessment system, wherein generating the plurality of theme clusters comprises grouping a first subset of the first set of reviews to a first theme cluster of the plurality of theme clusters based on the descriptive characteristics of the first subset of reviews being within a threshold distance of one another in the vector space, and grouping a second subset of the first set of reviews to a second theme cluster of the plurality of theme clusters based on the descriptive characteristics of the second subset of reviews being within the threshold distance of one another in the vector space; and
    presenting, by the quality assessment system, an interface comprising a first visualization for the first theme cluster, and a second visualization for the second theme cluster, wherein the first visualization graphically presents a sentiment expressed in the first subset of reviews and a first theme label that is defined from commonality amongst the descriptive characteristics of the first subset of reviews grouped to the first theme cluster, and wherein the second visualization graphically presents a sentiment expressed in a second subset of reviews and a second theme label that is defined from commonality amongst the descriptive characteristics of the second subset of reviews grouped to the second theme cluster.

2. The method of claim 1 further comprising: aggregating the plurality of reviews from a plurality of review sites using one or more crawlers.

3. The method of claim 2 further comprising:
    extracting content from the source sites using the one or more crawlers; and
    determining the first set of descriptive characteristics based on descriptive characteristics that are referenced in the content.

4. The method of claim 1 further comprising:
    generating a language model with a second neural network of the quality assessment system, wherein generating the language model comprises modeling structural patterns within sets of duplicate reviews; and
    removing a third set of the plurality of reviews based on each review of the third set of reviews and another review of the plurality of reviews comprising one of the structural patterns modeled within the language model.

5. The method of claim 1 further comprising:
    extracting one or more spans from each particular review of the first set of reviews with the encoder, wherein extracting the one or more spans comprises isolating segments of text within each particular review that reference at least one of the first set of descriptive characteristics with a sentiment; and
    classifying the sentiment associated with each span of the one or more spans.

6. The method of claim 5 further comprising:
    generating an interface that presents the one or more spans that are extracted from the first subset of reviews in response to a user interaction with the first visualization.

7. The method of claim 1 further comprising:
obtaining a timestamp for each review of the first subset of reviews; and
wherein the first visualization comprises a graphical representation that changes the sentiment of the first theme cluster based on the timestamp obtained for each review of the first subset of reviews.

8. The method of claim 1 further comprising:
generating, with a second neural network of the quality assessment system, one or more actionable insights based on the sentiment expressed in the first subset of reviews grouped to the first theme cluster; and
automatically implementing the one or more actionable insights.

9. The method of claim 8, wherein automatically implementing the one or more actionable insights comprises:
modifying content presented from a source site of the particular product or service.

10. The method of claim 8, wherein automatically implementing the one or more actionable insights comprises:
generating custom content based on a descriptive characteristic referenced in one or more of the first subset of reviews; and
providing the custom content to one or more users that posted the one or more reviews.

11. The method of claim 8, wherein automatically implementing the one or more actionable insights comprises:
determining a descriptive characteristic that is referenced in one or more of the first subset of reviews submitted by a particular user; and
generating a customized lead for contacting the particular user about the descriptive characteristic of the particular product or service.

12. A quality assessment system comprising: a computer with one or more processors that implement a neural network configured to:
receive a plurality of descriptive characteristics that describe attributes of a particular product or service and related products or services of competitors from source sites of the particular product or service and the competitors and from reviews of the particular product or service;
model a relevance of each particular descriptive characteristic from the plurality of descriptive characteristics based on a recurrence of the particular descriptive characteristic in the reviews of the particular product or service and a number of the source sites that mention the particular descriptive characteristic; and
generate a contextual relevance model that differentiates a first set of descriptive characteristics that are relevant to the particular product or service from a second set of descriptive characteristics that are irrelevant to the particular product or service based on a modeled relevance of each descriptive characteristic; and one or more processors configured to:
filter a plurality of reviews directed to the particular product or service based on the contextual relevance model, wherein filtering the plurality of reviews comprises retaining a first set of the plurality of reviews that reference one or more of the first set of descriptive characteristics, and discarding a second set of the plurality of reviews that do not reference one or more of the first set of descriptive characteristics;
compute a distance separating descriptive characteristics of the first set of reviews in a vector space based on semantic similarity between the descriptive characteristics of the first set of reviews;
generate a plurality of theme clusters by grouping a first subset of the first set of reviews to a first theme cluster of the plurality of theme clusters based on the descriptive characteristics of the first subset of reviews being within a threshold distance of one another in the vector space, and grouping a second subset of the first set of reviews to a second theme cluster of the plurality of theme clusters based on the descriptive characteristics of the second subset of reviews being within the threshold distance of one another in the vector space; and
present an interface comprising a first visualization for the first theme cluster, and a second visualization for the second theme cluster, wherein the first visualization graphically presents a sentiment expressed in the first subset of reviews and a first theme label that is defined from commonality amongst the descriptive characteristics of the first subset of reviews grouped to the first theme cluster, and wherein the second visualization graphically presents a sentiment expressed in a second subset of reviews and a second theme label that is defined from commonality amongst the descriptive characteristics of the second subset of reviews grouped to the second theme cluster.

13. The quality assessment system of claim 12 further comprising: one or more crawlers configured to aggregate the plurality of reviews from a plurality of review sites.

14. The quality assessment system of claim 13,
wherein the one or more crawlers are further configured to:
extract content from the source sites; and
wherein the one or more processors are further configured to:
determine the first set of descriptive characteristics based on descriptive characteristics that are referenced in the content.

15. The quality assessment system of claim 12 further comprising: a second neural network configured to:
generate a language model that models structural patterns within sets of duplicate reviews; and
remove a third set of the plurality of reviews based on each review of the third set of reviews and another review of the plurality of reviews comprising one of the structural patterns modeled within the language model.

16. The quality assessment system of claim 12 further comprising: an encoder configured to:
extract one or more spans from each particular review of the first set of reviews, wherein extracting the one or more spans comprises isolating segments of text within each particular review that reference at least one of the first set of descriptive characteristics with a sentiment; and
classify the sentiment associated with each span of the one or more spans.

17. The quality assessment system of claim 16, wherein the one or more processors are further configured to:
generate an interface that presents the one or more spans that are extracted from the first subset of reviews in response to a user interaction with the first visualization.

18. The quality assessment system of claim 12 further comprising:
a second neural network configured to:
generate one or more actionable insights based on the sentiment expressed in the first subset of reviews grouped to the first theme cluster; and automatically implement the one or more actionable insights.

19. A non-transitory computer-readable medium, storing a plurality of processor-executable instructions to:
retrieve a plurality of descriptive characteristics that describe attributes of a particular product or service and related products or services of competitors from source sites of the particular product or service and the competitors and from reviews of the particular product or service;
generate a contextual relevance model with a neural network of a quality assessment system, wherein generating the contextual relevance model comprises modeling a relevance of each particular descriptive characteristic from the plurality of descriptive characteristics based on a recurrence of the particular descriptive characteristic in the reviews of the particular product or service and a number of the source sites that mention the particular descriptive characteristic, and wherein the neural network differentiates a first set of descriptive characteristics that are relevant to the particular product or service from a second set of descriptive characteristics that are irrelevant to the particular product or service based on a modeled relevance of each descriptive characteristic;
filter a plurality of reviews directed to the particular product or service based on the contextual relevance model, wherein filtering the plurality of reviews comprises retaining a first set of the plurality of reviews that reference one or more of the first set of descriptive characteristics, and discarding a second set of the plurality of reviews that do not reference one or more of the first set of descriptive characteristics;
compute a distance separating descriptive characteristics of the first set of reviews in a vector space based on semantic similarity between the descriptive characteristics of the first set of reviews;
generate a plurality of theme clusters with an encoder of the quality assessment system, wherein generating the plurality of theme clusters comprises grouping a first subset of the first set of reviews to a first theme cluster of the plurality of theme clusters based on the descriptive characteristics of the first subset of reviews being within a threshold distance of one another in the vector space, and grouping a second subset of the first set of reviews to a second theme cluster of the plurality of theme clusters based on the descriptive characteristics of the second subset of reviews being within the threshold distance of one another in the vector space; and
present, by the quality assessment system, an interface comprising a first visualization for the first theme cluster, and a second visualization for the second theme cluster, wherein the first visualization graphically presents a sentiment expressed in the first subset of reviews and a first theme label that is defined from commonality amongst the descriptive characteristics of the first subset of reviews grouped to the first theme cluster, and wherein the second visualization graphically presents a sentiment expressed in a second subset of reviews and a second theme label that is defined from commonality amongst the descriptive characteristics of the second subset of reviews grouped to the second theme cluster.

* * * * *